(12) United States Patent
Sartran et al.

(10) Patent No.: US 10,389,606 B2
(45) Date of Patent: Aug. 20, 2019

(54) MERGING OF SCORED RECORDS INTO CONSISTENT AGGREGATED ANOMALY MESSAGES

(71) Applicant: Cisco Technology, Inc., San Jose, CA (US)

(72) Inventors: Laurent Sartran, Palaiseau (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 45 days.

(21) Appl. No.: 15/211,158

(22) Filed: Jul. 15, 2016

(65) Prior Publication Data
US 2017/0279694 A1    Sep. 28, 2017

Related U.S. Application Data

(60) Provisional application No. 62/313,165, filed on Mar. 25, 2016.

(51) Int. Cl.
| | | |
|---|---|---|
| *H04L 12/26* | (2006.01) | |
| *H04L 12/723* | (2013.01) | |
| *H04L 29/06* | (2006.01) | |
| *H04L 29/12* | (2006.01) | |
| *H04L 12/24* | (2006.01) | |

(52) U.S. Cl.
CPC ............. *H04L 43/08* (2013.01); *H04L 41/14* (2013.01); *H04L 43/045* (2013.01); *H04L 43/062* (2013.01); *H04L 45/50* (2013.01); *H04L 61/6022* (2013.01); *H04L 67/42* (2013.01)

(58) Field of Classification Search
CPC combination set(s) only.
See application file for complete search history.

(56) References Cited

U.S. PATENT DOCUMENTS

| | | | |
|---|---|---|---|
| 7,689,455 B2 | 3/2010 | Fligler et al. | |
| 9,798,876 B1* | 10/2017 | Parker-Wood | G06F 21/554 |
| 10,019,190 B2* | 7/2018 | Rao | G06F 16/245 |
| 2008/0215576 A1 | 9/2008 | Zhao et al. | |
| 2009/0077663 A1 | 3/2009 | Sun et al. | |
| 2012/0185275 A1* | 7/2012 | Loghmani | G06F 19/328 |
| | | | 705/3 |

(Continued)

OTHER PUBLICATIONS

Anderson et al. "Detecting Unusual Program Behavior Using the Statistical Component of the Next-generation Intrusion Detection Expert System (NIDES)" Computer Science Laboratory; SRI-CSL-95-06, May 1995; pp. 1-86.

*Primary Examiner* — Yee F Lam
(74) *Attorney, Agent, or Firm* — Behmke Innovation Group LLC; James Behmke; Stephen D. LeBarron

(57) ABSTRACT

In one embodiment, a device in a network identifies a plurality of traffic records as anomalous. The device matches each of the plurality of traffic records to one or more anomalies using one or more anomaly graphs. A particular anomaly graph represents hosts in the network as vertices in the graph and communications between hosts as edges in the graph. The device applies one or more ordering rules to the traffic records, to uniquely associate each traffic record to an anomaly in the one or more anomalies. The device sends an anomaly notification for a particular anomaly that is based on the traffic records associated with the particular anomaly.

18 Claims, 9 Drawing Sheets

(56) References Cited

U.S. PATENT DOCUMENTS

| | | | |
|---|---|---|---|
| 2013/0177935 A1* | 7/2013 | Di Carlo | G01N 15/1459 |
| | | | 435/29 |
| 2013/0198119 A1 | 8/2013 | Eberhardt, III et al. | |
| 2015/0020199 A1* | 1/2015 | Neil | H04L 63/1433 |
| | | | 726/23 |
| 2015/0026103 A1* | 1/2015 | Goldschmidt | G06N 99/005 |
| | | | 706/12 |
| 2015/0047026 A1* | 2/2015 | Neil | H04L 63/1425 |
| | | | 726/22 |
| 2017/0032130 A1* | 2/2017 | Durairaj | G06F 21/552 |
| 2017/0126718 A1* | 5/2017 | Baradaran | H04L 63/1425 |
| 2017/0163668 A1* | 6/2017 | Neil | H04L 63/1433 |

\* cited by examiner

MERGING OF SCORED RECORDS INTO CONSISTENT AGGREGATED ANOMALY MESSAGES

RELATED APPLICATION

This application claims priority to U.S. Provisional Application No. 62/313,165, filed on Mar. 25, 2016, entitled MERGING OF SCORED RECORDS INTO CONSISTENT AGGREGATED ANOMALY MESSAGES, by Sartran, et al., the contents of which are incorporated herein by reference.

TECHNICAL FIELD

The present disclosure relates generally to computer networks, and, more particularly, to merging of scored records into consistent aggregated anomaly messages.

BACKGROUND

Anomaly detection systems generally try to detect anomalous phenomena by collecting samples from a computer network at different granularities and abstraction levels (e.g., packets, flows, connections, sessions, etc.). In turn, an anomaly detection system may convert the collected data into quantitative measurements, which are sometimes called features (e.g., the number of bytes exchanged between host A and host B during time interval T, the number of packets exchanged between host A and server C in a given transaction, etc.). In some systems, these features are used as inputs for machine learning models trained to quantify how anomalous a particular sample is.

Typically, a machine learning-based anomaly detector outputs a set of records after each time interval. However, during a network attack or other anomalous event, this may result in a large number of anomalous records, which may be too cumbersome for a user to assess.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
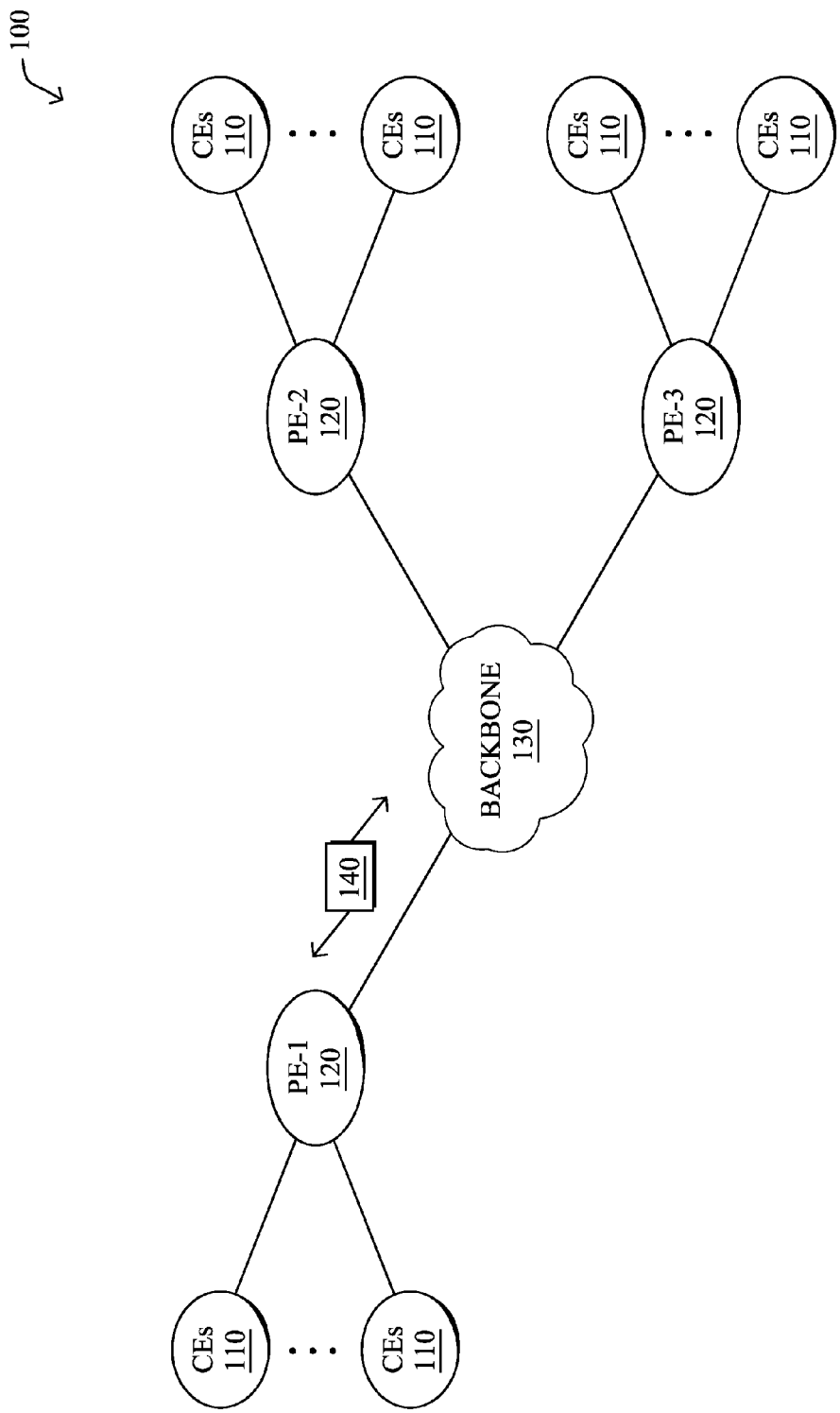
FIGS. 1A-1B illustrate an example communication network.

According to one or more embodiments of the disclosure, a device in a network identifies a plurality of traffic records as anomalous. The device matches each of the plurality of traffic records to one or more anomalies using one or more anomaly graphs. A particular anomaly graph represents hosts in the network as vertices in the graph and communications between hosts as edges in the graph. The device applies one or more ordering rules to the traffic records, to uniquely associate each traffic record to an anomaly in the one or more anomalies. The device sends an anomaly notification for a particular anomaly that is based on the traffic records associated with the particular anomaly.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
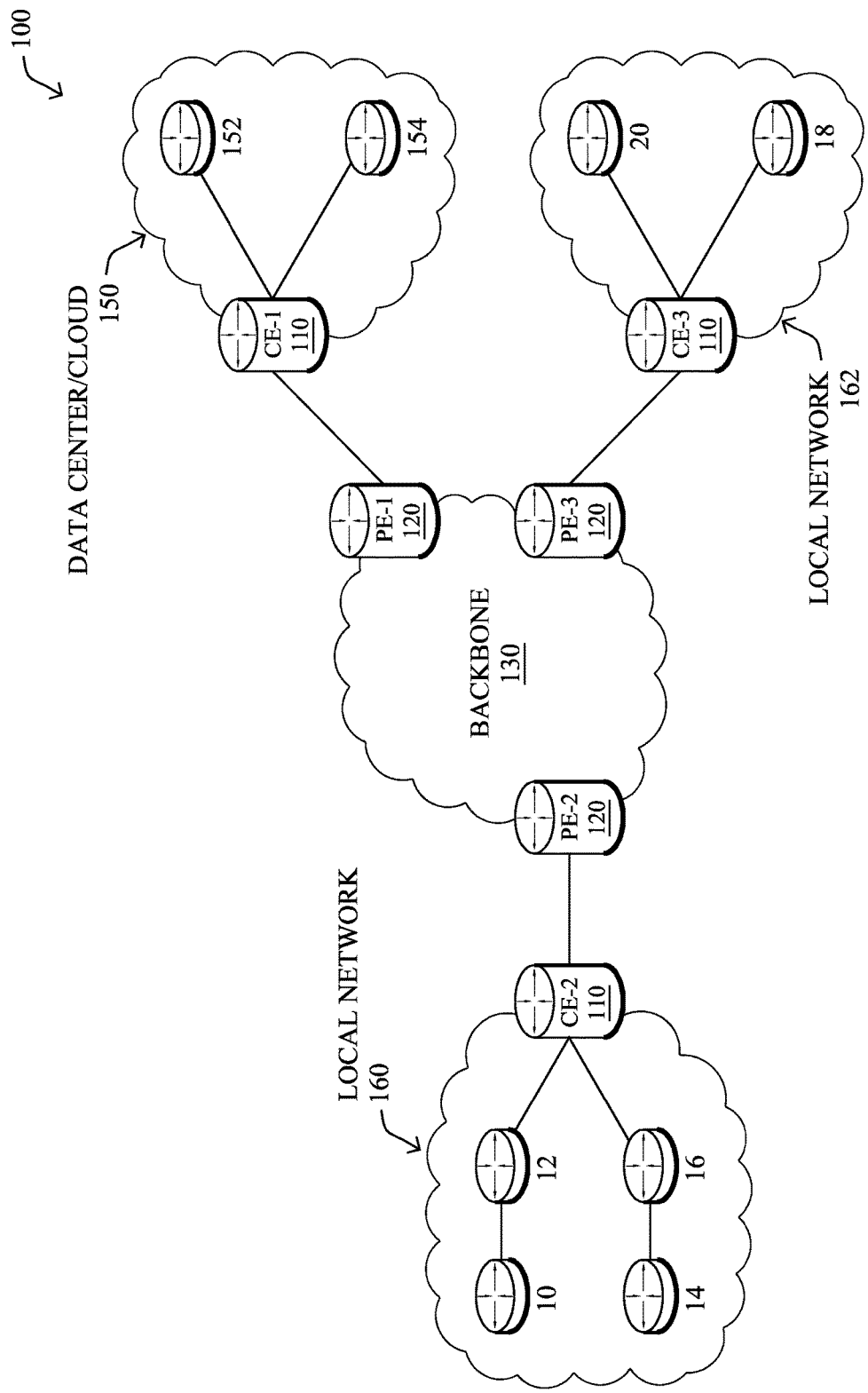

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
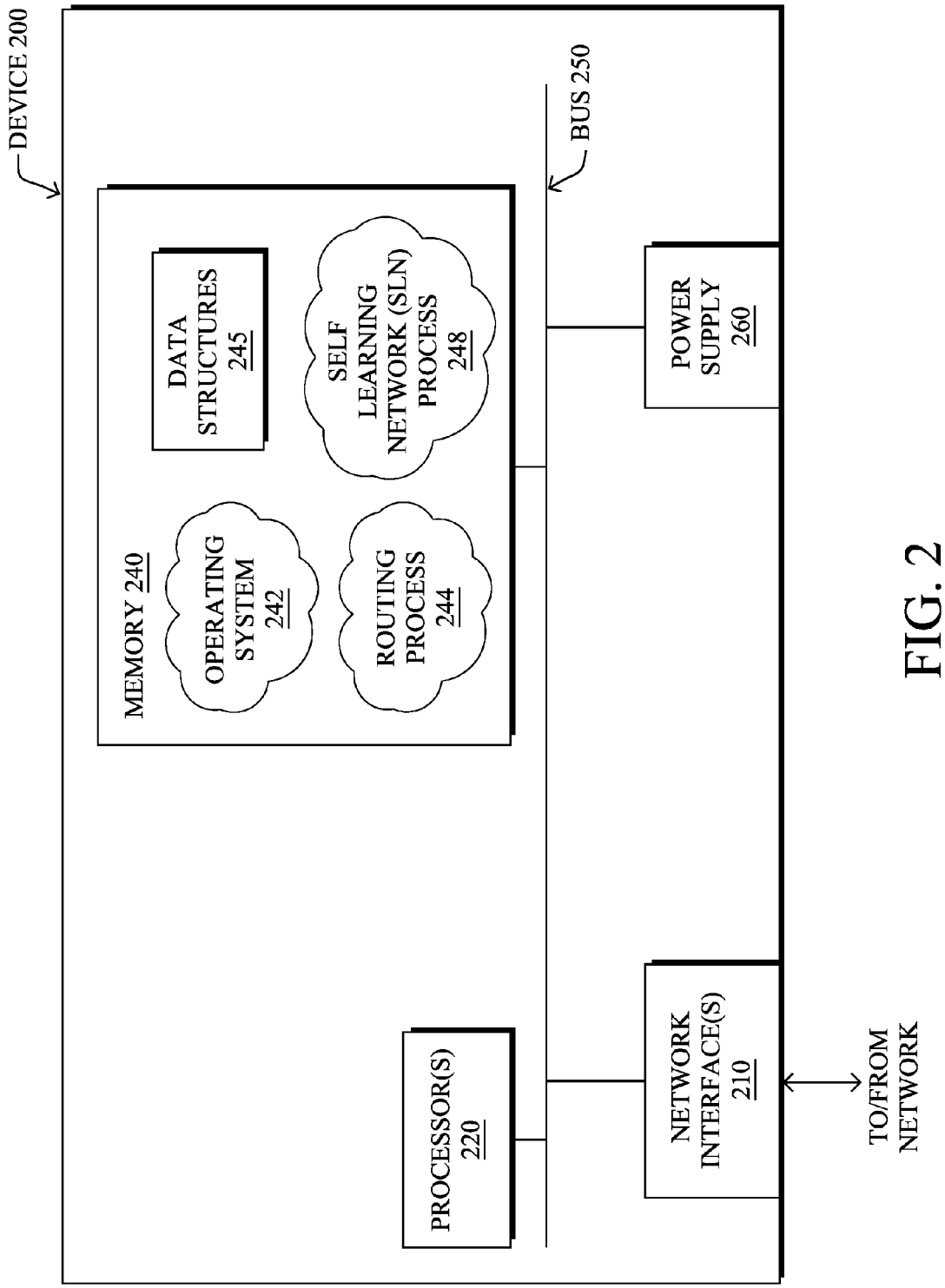
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
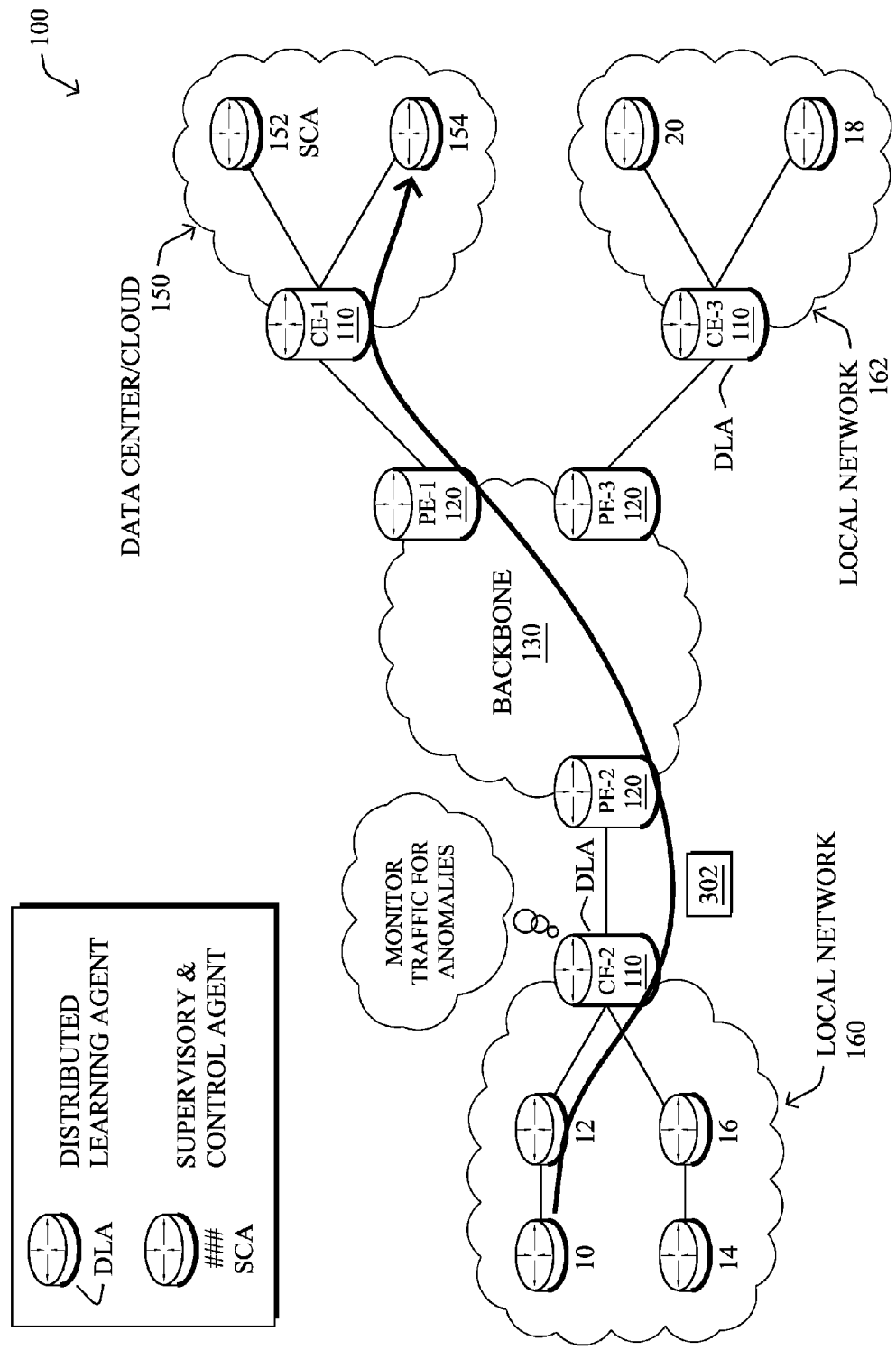
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
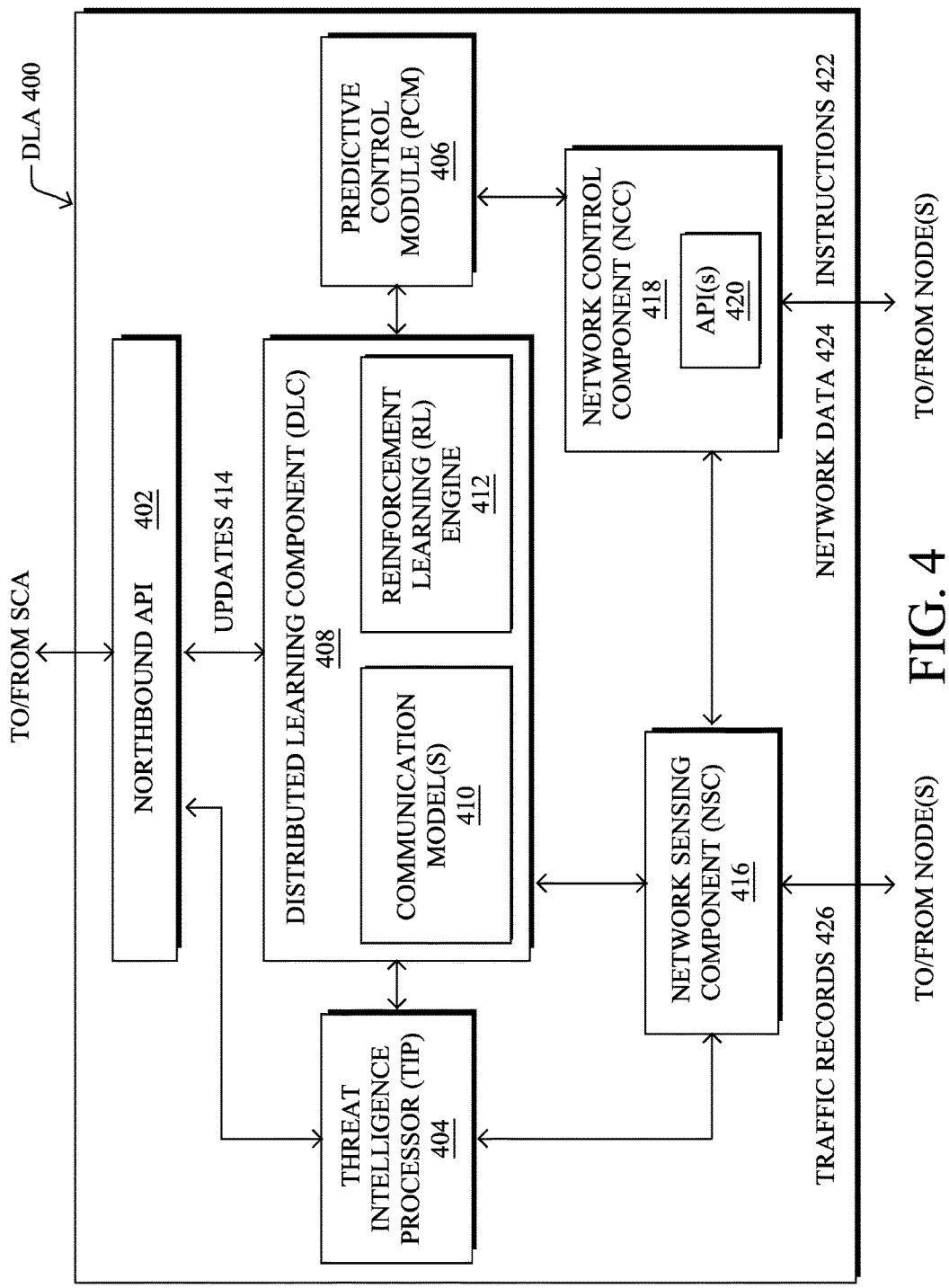
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feed-back loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, a machine learning-based anomaly detector may output an anomaly score for an analyzed traffic record. Thus, in some cases, the output can be represented as a triplet {time interval, key, score}, where the key includes information about the hosts or clusters of hosts involved, and the score represents how "anomalous" the particular sample is. Commonly, the key can be decomposed into a source, a destination, and some remaining attributes. As a result, a set of records of type (time, source, destination, feature, score) is produced at each time interval by the anomaly detector, potentially leading to a very large number of anomalous traffic records. However, when reporting anomalies to a user, the traffic records may be too cumbersome to assess on an individual basis.

Merging Scored Records Into Consistent
Aggregated Anomaly Messages

The techniques herein aggregate scored traffic records that correspond to the same networking event in a robust way, thus generating anomaly messages that are meaningful and interpretable. In some aspects, an anomaly detection system may represent the network using one or more graphs and generate a traffic record of the type {source, destination, flag}, where the flag is a Boolean indicator of whether the graph edge between the source and destination is exhibiting anomalous behavior. However, as noted, a high number of such records may have their flags set as true. To aggregate such records into anomaly notifications/alerts, the techniques herein introduce various mechanisms that perform a merging operation on the anomalous records, across time and across records that are considered to reflect the same underlying phenomenon. In further aspects, the techniques herein also cover variants that may be defined to adjust the expected topology of the created anomalies.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Specifically, in various embodiments, a device in a network identifies a plurality of traffic records as anomalous. The device matches each of the plurality of traffic records to one or more anomalies using one or more anomaly graphs. A particular anomaly graph represents hosts in the network as vertices in the graph and communications between hosts as edges in the graph. The device applies one or more ordering rules to the traffic records, to uniquely associate each traffic record to an anomaly in the one or more anomalies. The device sends an anomaly notification for a particular anomaly that is based on the traffic records associated with the particular anomaly.

Figure 5:
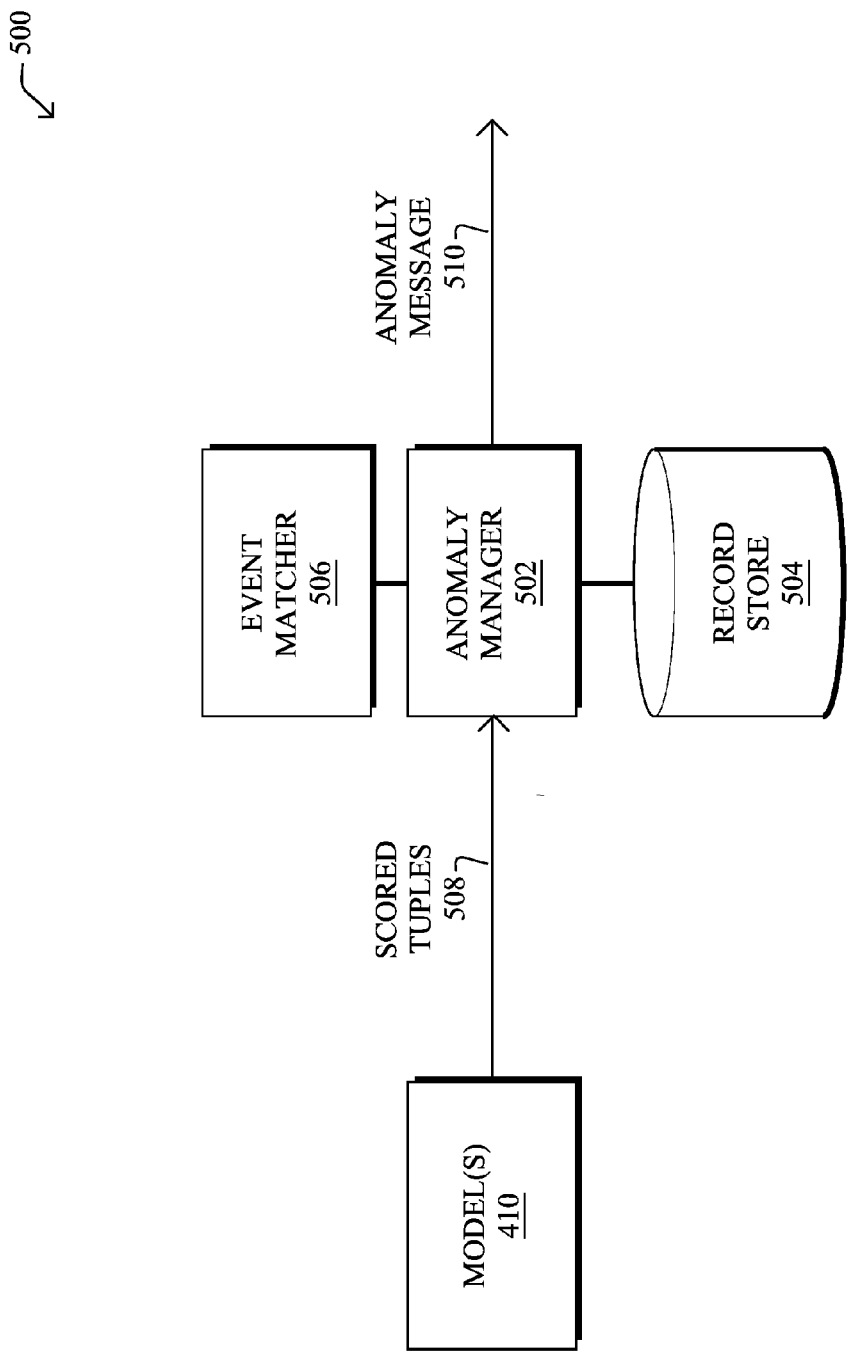
FIG. 5 illustrates an example architecture for merging scored traffic records.

Operationally, FIG. 5 illustrates an example architecture 500 for merging scored traffic records, according to various embodiments. As shown, a first aspect of the techniques herein is a newly defined anomaly message 510, which describes an anomalous phenomenon at a higher level of abstraction than the samples/traffic records that were used to detect the anomalous phenomenon. In particular, anomaly message 510 may be built around the notion of a "conversation" between a host A and another host B in the network, with potentially other discriminative attributes such as the application, the type of protocol, etc. In various embodiments, the anomaly message 510 is a collection data regarding a grouping of such conversations. In general, a conversation is undirected between hosts. In other words, the conversation between host A and host B is the same as the one between host B and host A. Another aspect of the techniques herein is an anomaly manager 502, which may be implemented as part of Distributed Learning Component (DLC) 408, as a standalone module, or integrated into any of the other modules of DLA 400. Generally, anomaly manager 502 takes as input a stream of scored tuples 508 and yields a stream of anomaly messages 510 as output. In some implementations, anomaly detection model(s) 410 may provide scored tuples 508 to anomaly manager 502 for further processing.

Scored tuples 508 may include any number of different parameters regarding a traffic flow assessed by anomaly detection model(s) 410. For example, scored tuples 508 may be scored traffic records the form {time, source, destination, key, score, feature, . . . }. The time in tuple 508 may be a timestamp or a time interval indicating the moment in time at which the network behavior was observed between the source and the destination. The source in a tuple 508 can be understood as a source address or set of addresses (note: the addressing scheme is not relevant, but this will be typically be an IPv4 or IPv6 address) and, similarly, the destination can be understood as a destination address or set of addresses in the same address space as the source. In some cases, the source and destination can be represented in tuple 508 using a commonly understood key. Tuple 508 may also include the anomaly detection score generated by anomaly detection model(s) when assessing the traffic record. In other cases, the score may be omitted from tuple 508 (e.g., when tuples 508 are only sent regarding anomalous behaviors). The features in tuple 508 may indicate the various traffic characteristics that model(s) 410 may assess (e.g., packet sizes, flow durations, applications, etc.).

Anomaly manager 502 may store tuples 508 in a record store 504 and, based on the stored records, anomaly manager 502 may generate and send anomaly messages 510 to other modules, devices, or user interfaces, for consumption. Anomaly manager 502 may also produce anomaly messages 510 either immediately (e.g., in response to detection of an anomaly), or after a predetermined maturation period.

To understand the processing performed by the techniques herein, it is useful to cast it as a partitioning problem, where the anomalous records between source S and destination D describe an undirected graph G. As output, the techniques herein provide a series of sub-graphs so that each edge in G is present in exactly one sub-graph. These sub-graphs verify properties that ensure that their edges correspond to the same underlying network anomaly.

In response to receiving a new, anomalous traffic record/tuple 508 (e.g., time, source destination, etc.), anomaly manager 502 may perform the steps listed below:

1.) Records that match an anomaly are added to the anomaly. In other words, they are added to the list of the records of the anomaly, and are not considered for further processing in step 2 below. Note that what it means to "match" an anomaly may vary and a number of possible variants are described below. When a record matches several anomalies, it is added to the preferred one. The ordering of anomalies that match a record may also vary, and these variants are also described below. If no record matches an existing anomaly, anomaly manager 502 may take no further action. Otherwise, anomaly manager 502 may continue on to step 2 below.

2.) Anomaly manager 502 may create a new anomaly to match the greatest possible number of records. When several anomalies can be created that all match the same number of records, the anomaly that is created is the preferred one. The ordering of the anomaly candidates for creation may also vary. Once this step is complete, anomaly manager 502 then returns processing back to step 1, above.

Another aspect of the techniques herein is a new module called the event matcher 506 that works in conjunction with anomaly manager 502 and record store 504 (e.g., as part of DLC 408, another module, or as a stand-alone module). Generally, event manager 506 implements strategies to decide whether a particular record matches an existing anomaly, and updates the structure of the anomaly. These strategies are all meant to achieve a regrouping of the records in a way understandable for the user. Many embodiments are possible, but two prominent implementations are listed below:

Implementation 1: anomalies are represented as star-shaped graphs (e.g., graphs with graph diameters equal to two, at maximum). In this implementation, each graph will have a particular vertex/host that can be distinguished such that it is an endpoint for all edges in the graph. This vertex is referred to as the center of the anomaly. In that case, the merging operation is such that a record matches an anomaly if the source of the record, or its destination, is the center of the anomaly.

Implementation 2: this is a generalization of the above and represents anomalies as graphs having diameters of at most k (k>=2). In such a case, event matcher 506 may determine that a given record matches an anomaly if adding the record to the anomaly graph does not cause the diameter of the graph to exceed k. In other words, event matcher 506 may determine whether adding an edge that represents a given traffic record to a particular anomaly graph would cause the diameter of the graph to exceed a predefined limit.

Anomaly manager 502 may employ any number of ordering rules on the anomaly matches from event matcher 506, to uniquely associate a given record with a particular anomaly. For example, one such rule may implement total order on anomalies that match the same record. Various total orders may be defined in different implementations, but some common properties may be desirable. One such property is that if several anomalies match records $R_1$ and $R_2$ (e.g., event matcher 506 determines that records $R_1$ and $R_2$ are matched to the anomalies in the set $\{A_1\text{-}A_n\}$), and if $A_1$ is the preferred one for both $R_1$ and $R_2$, then adding $R_1$ to $A_1$ should not impact the ordering of $\{A_1\text{-}A_n\}$ for matching $R_2$. This guarantees that the order of the records processed by anomaly manager 502 using the steps above within the same time interval has no impact on which record is added to which anomaly. An example of total order is the lexical order on tuples (# of hosts in anomaly, # of hosts as source in anomaly, source IP of central host) when star-shaped anomaly graphs are used by event matcher 506, where the number of hosts in an anomaly is the number of hosts that appear either as source or destination of a record.

Another ordering rule may impose total order on candidate anomalies for a given set of unmatched anomalous records. Various total orders are possible, such as ordering the candidate anomalies by central host/vertex, when event matcher 506 uses star-shaped graphs during the matching operation.

Figure 6A:
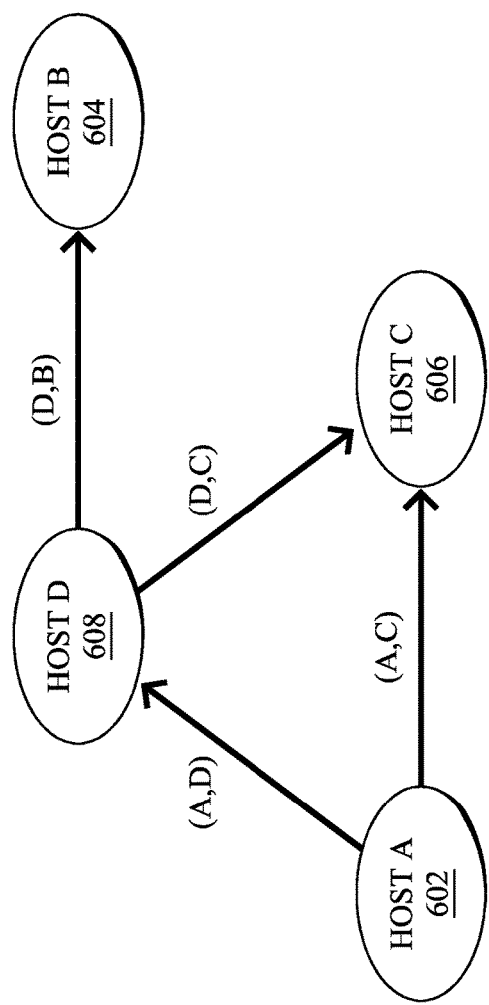
FIGS. 6A-6C illustrate example anomaly graphs.

By way of example of operation, and referring to FIG. 6A, consider the case in which the system identifies a set of four anomalous records: {(source=A, destination=D), (A,C), (D,C), (D,B)}, where A, B, C, D are hosts in the network and anomaly manager 502 receives these records at a time $t_0$. As shown, these records can be represented by a graph 600 in which vertices 602-608 represent hosts A-D, respectively, and the edges between vertices 602-608 correspond to the conversations/communications between these hosts, as indicated by the traffic records.

Figure 6B:
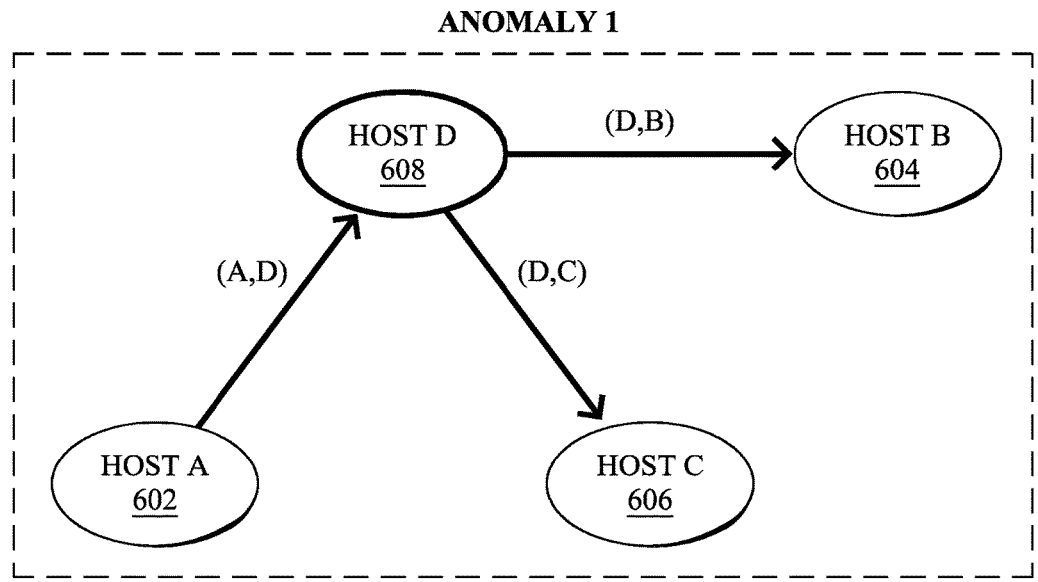
Figure 6C:
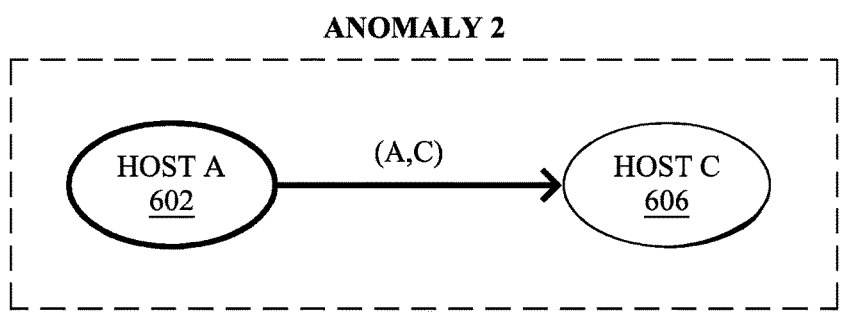

During processing, assume that anomaly manager 502 performs the steps described previously on the records represented in graph 600. Further, assume that event matcher 506 is configured to use star-shaped anomaly graphs. In such a case, the system may operate as follows:
 Step 1: No anomaly exists, so no records match an anomaly.
 Step 2: The set of four traffic records from above are flagged as anomalous and anomaly is created to match the greatest possible number of records. In such a case, event matcher 506 may create a star-shaped anomaly around host D, which matches three records, as shown in FIG. 6B. An anomaly around host A would have matched two records, just like an anomaly around host C, an anomaly created around host B would have matched a single record.
 Step 3: The records {(A,D),(D,C),(D,B)} are added the newly-created anomaly (e.g., by associating the records with the anomaly graph shown in FIG. 6B). No other anomaly exists at this point, so no ordering rules are needed. Three new conversations are created: {{A,D}, {D,C},{D,B}}. However, the record {A,C} matches no existing anomaly.
 Step 4: Event matcher 506 creates another anomaly map to match {A,C}, as shown in FIG. 6C. In this situation, two anomalies are actually associated with the traffic record: one centered around host A and one centered around host C. In such a case, anomaly manager 502 may apply an ordering rule among the hosts (e.g., host A takes precedence over host C), to select host A as the center of the created anomaly.
 Step 5: Anomaly manager 502 adds the record {A,C} the anomaly from step 4, leaving no further records in record store 504 unmatched for the time period. In such a case, processing of the records for the time period is complete.

Based on the above, anomaly manager 502 may generate and send two anomaly messages 510 downstream in the network for further processing, at $t_0$ or at the end of the maturation period. Continuing the above example, these anomaly messages 510 may include at least the following information:
 Anomaly message #1:
 Central host: host D
 Conversations:
  {A, D} with one anomalous record ($t_0$, A, D);
  {D, C} with one anomalous record ($t_0$, D, C);
  {D, B} with one anomalous record ($t_0$, D, B);
 Anomaly message #2:
 Central host: host A
 Conversations:
  {A, C} with one anomalous record ($t_0$, A, C).

An additional aspect of the techniques herein is a mechanism to destroy or delete an anomaly (e.g., a generated anomaly map), if the corresponding phenomenon is no longer observed. Indeed, beyond creating anomalies that are consistent in terms of structure, anomaly manager 502 must also make sure that anomalous phenomena are well captured in time. This means that anomalies must be capped in duration. Therefore, anomaly manager 502 may set a timer to remove an anomaly, if no record has been added to it for too long, or if it was created too long ago compared to the current time. For processing reasons, it may be useful to consider a variant of the above techniques in which anomalies can be in either one of two states, A or B, such that anomalies in state B have a stronger (e.g., more restrictive) matching operation. That allows communication with downstream components about these anomalies, without invalidating the function of these components.

Figure 7:
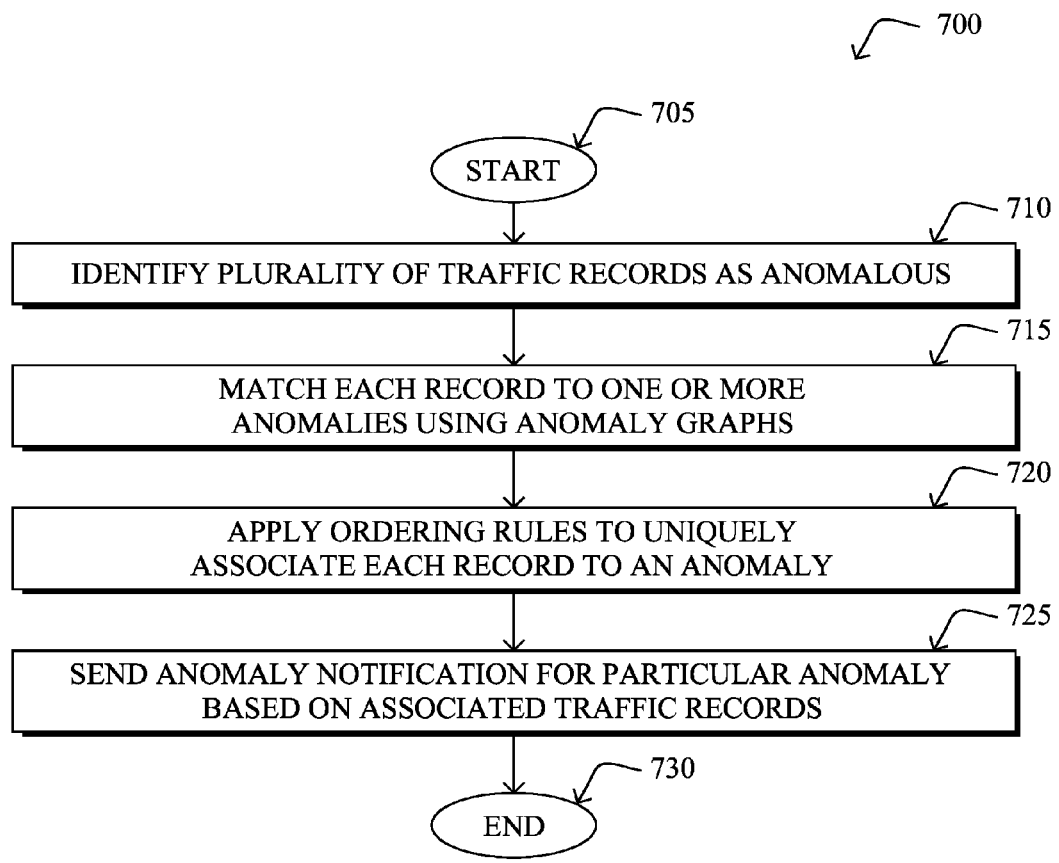
FIG. 7 illustrates an example simplified procedure for merging traffic records to report anomalies.

FIG. 7 illustrates an example simplified procedure for merging traffic records to report anomalies, in accordance with various embodiments herein. Generally, a specialized network device (e.g., device 200) may perform procedure 700 (e.g., by executing stored instructions), thereby improving the operations of the device and the network itself. For example, a network edge router or other device acting as a DLA, or a central device acting as an SLA, may perform procedure 700, to aggregate anomalous traffic records into a reduced set of reported anomalies. Procedure 700 may start at step 705 and continues on to step 710 where, as described in greater detail above, the device may identify a plurality of traffic records as anomalous. For example, the device may receive an indication that the traffic records are anomalous from one or more machine learning-based anomaly detectors. The anomalous traffic records may indicate, in some cases, a source host or set of set of source hosts in a cluster, a destination host or set of destination hosts in a cluster, and any other information regarding a given traffic flow in the network.

At step 715, as detailed above, the device may match each anomalous record to one or more anomalies using one or more anomaly graphs. Such an anomaly graph may represent hosts in the network as vertices in the graph and communications/conversations between hosts as edges in the graph. Generally, the device may attempt to generate anomaly graphs that maximize the number of anomalous records that match the graph. In some cases, the device may use star-shaped anomaly graphs such that at least one of the graphs has a vertex that is an endpoint of all edges in the graph. In other implementations, the device may allow for larger graph diameters, subject to a limit.

At step 720, the device may apply one or more ordering rules, to uniquely associate each of the anomalous traffic records with an anomaly, as described in greater detail above. For example, assume that the device uses star-shaped graphs whereby each of the anomaly graphs has a central vertex/host. In such a case, the device may apply an ordering to the hosts, to select which anomaly a given record should be associated (e.g., if a record R matches two or more of the anomalies).

At step 725, as detailed above, the device may send an anomaly notification for a particular one of the anomalies based on the traffic records associated with the anomaly. For example, the device may send the anomaly notification as a message to another device in the network (e.g., a central server) or to a user interface for presentation to a user. Using the aggregation mechanisms above, the notification may have any number of uniquely associated traffic records, greatly reducing the number of anomalies to be reported via anomaly notifications. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for the merging of scored records into consistent aggregated anomaly messages. In particular, the techniques herein are critical to the design of real-world anomaly detection systems, providing a principled way to aggregate low-level records produced by a machine learning-based anomaly detector into messages that can be consumed downstream by other modules and/or users. Additionally, the techniques herein reduce the bandwidth required for anomaly reporting, and allow for the creation of an anomaly context which is more meaningful. For example, if the system detects a malicious scan, it is more useful to show a single anomaly depicting all of the scanning flows than to show a large group of single flow anomalies.

From a high rate stream of anomalous records, the techniques herein provide a lower rate stream of anomaly objects that are interpretable, meaningful, and aggregated from records. For instance, the techniques achieve this by considering the edge partitioning problem on the graph, where the partitioning obeys properties to give meaning and interpretability to the anomalies. The techniques do not depend on the processing order of the records, giving flexibility and stability to the system. Also, the techniques herein are flexible, in so far as specifying different matching operations, or ordering on anomalies matching the same records, allows various kind of anomalies to be generated, accommodating the choices of the designers of the system.

While there have been shown and described illustrative embodiments that provide for merging of scored records into consistent aggregated anomaly messages, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   identifying, by a device in a network, a plurality of traffic records as anomalous using one or more anomaly detection models;
   once the plurality of traffic records have been identified as anomalous, merging, by the device, the traffic records based on time and a same underlying phenomenon, wherein the merging includes:
   (i) matching, by the device, each of the plurality of traffic records identified by the one or more anomaly detection models to one or more anomalies using one or more anomaly graphs, wherein the matching each of the plurality of traffic records to the one or more anomalies using the one or more anomaly graphs comprises adding a particular traffic record to a particular anomaly graph based on a diameter of the particular anomaly graph being below a threshold size, wherein the particular anomaly graph represents hosts in the network as vertices in the particular anomaly graph and communications between hosts as edges in the graph, and a particular communication of the edges is conversation between a destination host and a source host, and
   (ii) applying, by the device, one or more ordering rules to the traffic records, to uniquely associate each traffic record to an anomaly in the one or more anomalies; and
   sending, by the device, an anomaly notification for a particular anomaly that is based on the traffic records associated with the particular anomaly.

2. The method as in claim 1, further comprising:
   generating, by the device, the particular anomaly graph to maximize a number of the traffic records matched to the particular anomaly graph.

3. The method as in claim 1, wherein a particular one of the traffic records is matched to a plurality of anomalies, and wherein the one or more ordering rules cause the device to uniquely associate a particular one of the traffic records to a selected one of the matched anomalies based on a selected anomaly having a largest corresponding anomaly graph from among the anomalies matched to the particular traffic record.

4. The method as in claim 1, wherein matching each of the plurality of traffic records to the one or more anomalies using one or more anomaly graphs comprises:
   determining, by the device, whether a particular traffic record can be included in an existing anomaly graph; and generating, by the device, a new anomaly graph based on the particular traffic record, when the particular traffic record cannot be included in an existing anomaly graph.

5. The method as in claim 1, wherein matching each of the plurality of traffic records to the one or more anomalies using the one or more anomaly graphs comprises:
forming, by the device, the one or more anomaly graphs as star-shaped graphs, wherein each of the star-shaped graphs comprises a center vertex that is an endpoint of each edge in the particular anomaly graph.

6. The method as in claim 5, wherein the one or more ordering rules comprise an ordering of the hosts represented by the one or more center vertices of the star-shaped graphs.

7. The method as in claim 1, further comprising:
disabling, by the device, the particular anomaly after expiration of a timer.

8. The method as in claim 1, wherein identifying the plurality of traffic records as anomalous comprises:
receiving, from a machine learning-based anomaly detector, anomaly scores associated with the traffic records.

9. An apparatus, comprising:
one or more network interfaces to communicate with a network;
a processor coupled to the network interfaces and configured to execute one or more processes; and
a memory configured to store a process executable by the processor, the process when executed operable to:
identify a plurality of traffic records as anomalous using one or more anomaly detection models;
once the plurality of traffic records have been identified as anomalous, merge the traffic records based on time and a same underlying phenomenon, wherein the merge of the traffic records includes:
(i) match each of the plurality of traffic records identified by the one or more anomaly detection models to one or more anomalies using one or more anomaly graphs, wherein the match of each of the plurality of traffic records to the one or more anomalies using the one or more anomaly graphs comprises adding a particular traffic record to a particular anomaly graph based on a diameter of the particular anomaly graph being below a threshold size, wherein the particular anomaly graph represents an anomaly as a graph, the graph showing hosts in the network as vertices in the particular anomaly graph and communications between hosts as edges in the graph, and a particular communication of the edges is conversation between a destination host and a source host, and
(ii) apply one or more ordering rules to the traffic records, to uniquely associate each traffic record to an anomaly in the one or more anomalies; and
send an anomaly notification for a particular anomaly that is based on the traffic records associated with the particular anomaly.

10. The apparatus as in claim 9, wherein the process when executed is further operable to:
generate the particular anomaly graph to maximize a number of the traffic records matched to the particular anomaly graph.

11. The apparatus as in claim 9, wherein a particular one of the traffic records is matched to a plurality of anomalies, and wherein the one or more ordering rules cause the device to uniquely associate a particular one of the traffic records to a selected one of the matched anomalies based on a selected anomaly having a largest corresponding anomaly graph from among the anomalies matched to the particular traffic record.

12. The apparatus as in claim 9, wherein the apparatus matches each of the plurality of traffic records to the one or more anomalies using one or more anomaly graphs by:
determining whether a particular traffic record can be included in an existing anomaly graph; and
generating a new anomaly graph based on the particular traffic record, when the particular traffic record cannot be included in an existing anomaly graph.

13. The apparatus as in claim 9, wherein the apparatus matches each of the plurality of traffic records to the one or more anomalies using one or more anomaly graphs by:
forming the one or more anomaly graphs as star-shaped graphs, wherein each of the star-shaped graphs comprises a center vertex that is an endpoint of each edge in the particular anomaly graph.

14. The apparatus as in claim 13, wherein the one or more ordering rules comprise an ordering of the hosts represented by the one or more center vertices of the star-shaped graphs.

15. The apparatus as in claim 9, wherein the process when executed is further operable to:
disable the particular anomaly after expiration of a timer.

16. The apparatus as in claim 9, wherein the apparatus identifies the plurality of traffic records as anomalous by:
receiving, from a machine learning-based anomaly detector, anomaly scores associated with the traffic records.

17. The apparatus as in claim 9, wherein the apparatus is an edge device at an edge of the network.

18. A tangible, non-transitory, computer-readable medium storing program instructions that cause a device in a network to execute a process comprising:
Identifying a plurality of traffic records as anomalous using one or more anomaly detection models;
once the plurality of traffic records have been identified as anomalous, merging the traffic records based on time and a same underlying phenomenon, wherein the merging includes:
(i) matching each of the plurality of traffic records identified by the one or more anomaly detection models to one or more anomalies using one or more anomaly graphs, wherein the matching each of the plurality of traffic records to the one or more anomalies using the one or more anomaly graphs comprises adding a particular traffic record to a particular anomaly graph based on a diameter of the particular anomaly graph being below a threshold size, wherein the particular anomaly graph represents an anomaly as a graph, the graph showing hosts in the network as vertices in the graph and communications between hosts as edges in the particular anomaly graph, and a particular communication of the edges is conversation between a destination host and a source host, and
(ii) applying one or more ordering rules to the traffic records, to uniquely associate each traffic record to an anomaly in the one or more anomalies; and
sending an anomaly notification for a particular anomaly that is based on the traffic records associated with the particular anomaly.

* * * * *